United States Patent
Sestito et al.

(10) Patent No.: US 7,630,297 B2
(45) Date of Patent: Dec. 8, 2009

(54) TRAIL/PATH PROTECTION FOR SDH/SONET NETWORKS

(75) Inventors: Vincenzo Sestito, Milan (IT); Giorgio Cazzaniga, Monte Mareno (IT)

(73) Assignee: Alcatel, Paris (FR)

( * ) Notice: Subject to any disclaimer, the term of this patent is extended or adjusted under 35 U.S.C. 154(b) by 932 days.

(21) Appl. No.: 10/822,667

(22) Filed: Apr. 13, 2004

(65) Prior Publication Data

US 2005/0099941 A1  May 12, 2005

(30) Foreign Application Priority Data

Nov. 12, 2003 (EP) .................................. 03292866

(51) Int. Cl.
*G01R 31/08* (2006.01)
*H04L 12/28* (2006.01)
(52) U.S. Cl. ...................... 370/218; 370/222; 370/228; 370/389; 370/395.51
(58) Field of Classification Search ......... 370/216–229, 370/242–247; 398/1–5; 714/1–2
See application file for complete search history.

(56) References Cited

U.S. PATENT DOCUMENTS

| 5,488,606 | A  | * | 1/1996  | Kakuma et al. ............ 370/219 |
| 5,831,970 | A  | * | 11/1998 | Arao ......................... 370/227 |
| 5,974,027 | A  | * | 10/1999 | Chapman .................... 370/228 |
| 6,141,320 | A  |   | 10/2000 | Ikawa |
| 6,324,318 | B1 | * | 11/2001 | Suzuki ........................ 385/24 |
| 6,366,556 | B1 | * | 4/2002  | Ballintine et al. ........... 370/216 |
| 6,580,731 | B1 | * | 6/2003  | Denton ....................... 370/539 |
| 6,765,928 | B1 | * | 7/2004  | Sethuram et al. ............ 370/476 |
| 6,912,201 | B1 | * | 6/2005  | Yoshida et al. .............. 370/248 |
| 6,920,149 | B2 | * | 7/2005  | Robledo et al. ............. 370/458 |
| 7,058,056 | B2 | * | 6/2006  | Yehuda et al. .............. 370/394 |

(Continued)

FOREIGN PATENT DOCUMENTS

JP  7-177114 A  7/1995

(Continued)

OTHER PUBLICATIONS

ITU-T G.783 dated Oct. 2000—Characteristics of synchronous digital hierarchy (SDH) equipment functional blocks.

(Continued)

*Primary Examiner*—Huy D. Vu
*Assistant Examiner*—Brandon Renner
(74) *Attorney, Agent, or Firm*—Sughrue Mion, PLLC (57) ABSTRACT

A method is described for enhancing a trail/path protection function in a SDH/SONET network, the network comprising a number of working resources and a number of protection resources and transmitting signal frames having a section overhead in SDH technology, or a Line OverHead in SONET technology, and a POH, said protection function comprising linear MSP N:1 trail protection function based on transmission of protection information through K1 and K2 bytes of Section OverHead in SDH or Line OverHead in SONET, wherein the method further comprises the step of mapping the content of said K1 and K2 bytes by protocol exchange into POH bytes of the path overhead in SDH or SONET, at Low Order and/or High Order level, so as to allow the handling of more than one protecting resource shared among different working resources, both in end-to-end handling and in intermediate handling.

17 Claims, 8 Drawing Sheets

U.S. PATENT DOCUMENTS

| | | | |
|---|---|---|---|
| 7,167,443 B1* | 1/2007 | Dantu et al. | 370/218 |
| 7,227,844 B1* | 6/2007 | Hall et al. | 370/242 |
| 2001/0043603 A1* | 11/2001 | Yu | 370/393 |
| 2003/0002505 A1* | 1/2003 | Hoch et al. | 370/392 |
| 2003/0043734 A1* | 3/2003 | Takeguchi | 370/216 |
| 2003/0043736 A1* | 3/2003 | Gonda | 370/218 |
| 2003/0058789 A1* | 3/2003 | Sugawara et al. | 370/222 |
| 2003/0117951 A1 | 6/2003 | Wiebe et al. | |
| 2003/0123493 A1* | 7/2003 | Takahashi | 370/539 |
| 2003/0185149 A1* | 10/2003 | Daniell et al. | 370/217 |
| 2004/0109408 A1* | 6/2004 | Mesh et al. | 370/222 |
| 2005/0058060 A1* | 3/2005 | Caldwell et al. | 370/216 |
| 2005/0088963 A1* | 4/2005 | Phelps et al. | 370/216 |
| 2005/0099941 A1* | 5/2005 | Sestito et al. | 370/228 |

FOREIGN PATENT DOCUMENTS

| | | | |
|---|---|---|---|
| JP | 07177114 A | * | 7/1995 |
| WO | WO 9900942 A2 | * | 1/1999 |
| WO | WO 03/105379 A1 | | 12/2003 |

OTHER PUBLICATIONS

ITU-T G.707/Y.1322 dated Oct. 2000—Network Node Interface for the synchronous digital hierarchy (SDH).

Bellcore Gr-1400-Core Issue 2, Jan. 1999—Sonet Dual-Fed Unidirectional Path Switched Ring (UPSR) Equipment Generic Criteria.

ITU-T G.841 dated Oct. 1998—Types and characteristics of SDH network protection architectures.

Bellcore GR-1230 Core, Issue 4, Dec. 1998—Sonet Bidirectional Line-Switched Ring Equipment Generic Criteria.

Telcordia Technologies—GR-253-Core, Issue 3, Sep. 2000—Synchronous Optical Network (SONET) Transport Systems: Common Generic Criteria.

* cited by examiner

| 1st frame | 2nd frame | 3rd frame | 4th frame | K1 (1-4) | K1 (5-8) | K2 (1-4) |

Fig. 5a

| 1st frame | 2nd frame | 3rd frame | 4th frame | 5th frame | 6th frame | 7th frame | 8th frame | K1 (1-2) | K1 (3-4) | K1 (5-6) | K1 (7-8) | K2 (1-2) | K2 (3-4) |

TRAIL/PATH PROTECTION FOR SDH/SONET NETWORKS

This application is based on and claims the benefit of the European Patent Application No. 03 292 866.5 filed on Nov. 12, 2003, which is incorporated by reference herein.

BACKGROUND OF THE INVENTION

1. Field of the Invention

The present invention relates to synchronous transport networks and in particular to a novel method for providing N:M trail/path protection in SDH or SONET networks.

2. Description of the Prior Art

It is known in the art to protect a physical section or span between two network elements (for instance two ADM's or DXC's) by a MSP "1:1" (or "1+1") mechanism. In MSP 1+1, a signal is transmitted from a first network element to a second network element and the same signal is permanently bridged by using the other (spare) physical line. At the second network element, the best signal is selected and terminated. On the contrary, in MSP 1:1 mechanism, the signal is bridged on the protection line only in case of failure of the working resources.

For protecting a network through a similar mechanism, a plurality of different MSP 1:1 or 1+1 mechanisms should be provided for protecting the corresponding plurality of physical sections (spans between two nodes) in the network. In any case, possible failures of the network elements (for instance of the crossconnection matrix thereof) are not protected through the MSP mechanism.

In order to overcome the above disadvantages, ITU-T G. 841 Recommendation provides for High Order (or Low Order) linear VC-trail protection mechanism, limited to 1+1 or 1:1 scheme. According to VC-trail mechanism, normal traffic is carried over, or selected from, a protection trail instead of a working trail if the working trail fails or if its performance falls below a required level. For these schemes, ITU-T 707 defines the POH bytes to be used and allocated and the bits within the bytes whilst the protocol rules definition is "for further study".

As far as SONET technology is concerned, Recommendations Bellcore GR-1400 and Telcordia Technologies GR-253 do not define, at path level (STS1, VT), any protection scheme based on protocol exchange and reserve POH bytes (equivalent to those ones considered in SDH) for "future growth", not defining, then, their use.

Restoration (i.e. network management assisted switch) requires implicitly the use of an OS application in order to be performed. In multi-operator environment, the network is made-up by different domains with different OS applications. Consequently, the restoration of path(s) installed through the whole network becomes very hard to be performed, since requiring a negotiation between operators, so as the compatibility between OS applications. In addition, the time required for traffic re-routing (hundreds of msec) is highly huge with respect to an automatic process handled at NE level (tens of msec).

SUMMARY OF THE INVENTION

The general object of the present invention is providing a method for realizing an "N:M trail/path protection scheme" at High Order/Low Order path layer, with N being the number of working paths/trails and M being the number of protection paths/trails.

A further object of the present invention is providing a method for realizing such an "N:M trail/path protection scheme" which may work both as End-to-End protection scheme and as Intermediate protection scheme: consequently, it can perform path protection both in a single operator network and in a multi-operator network wherein domains are nested.

Thus, the present invention answers the need of improving traffic (path) reliability in meshed/linear networks managed both by a unique operator and by more operators, optimizing, at the same time, the use of connectivity resources by sharing one or more protecting resources among different working resources.

The above and flrt her objects are obtained by a method, a network element, a computer program and a computer readable medium. Further advantageous features of the present invention are set forth in the dependent claims. All the claims are intended to be an integral part of the present specification.

The present invention will become clear after reading the following detailed description with reference to the attached drawings.

BEST MODE FOR CARRYING OUT THE INVENTION

Figures 1, 2:
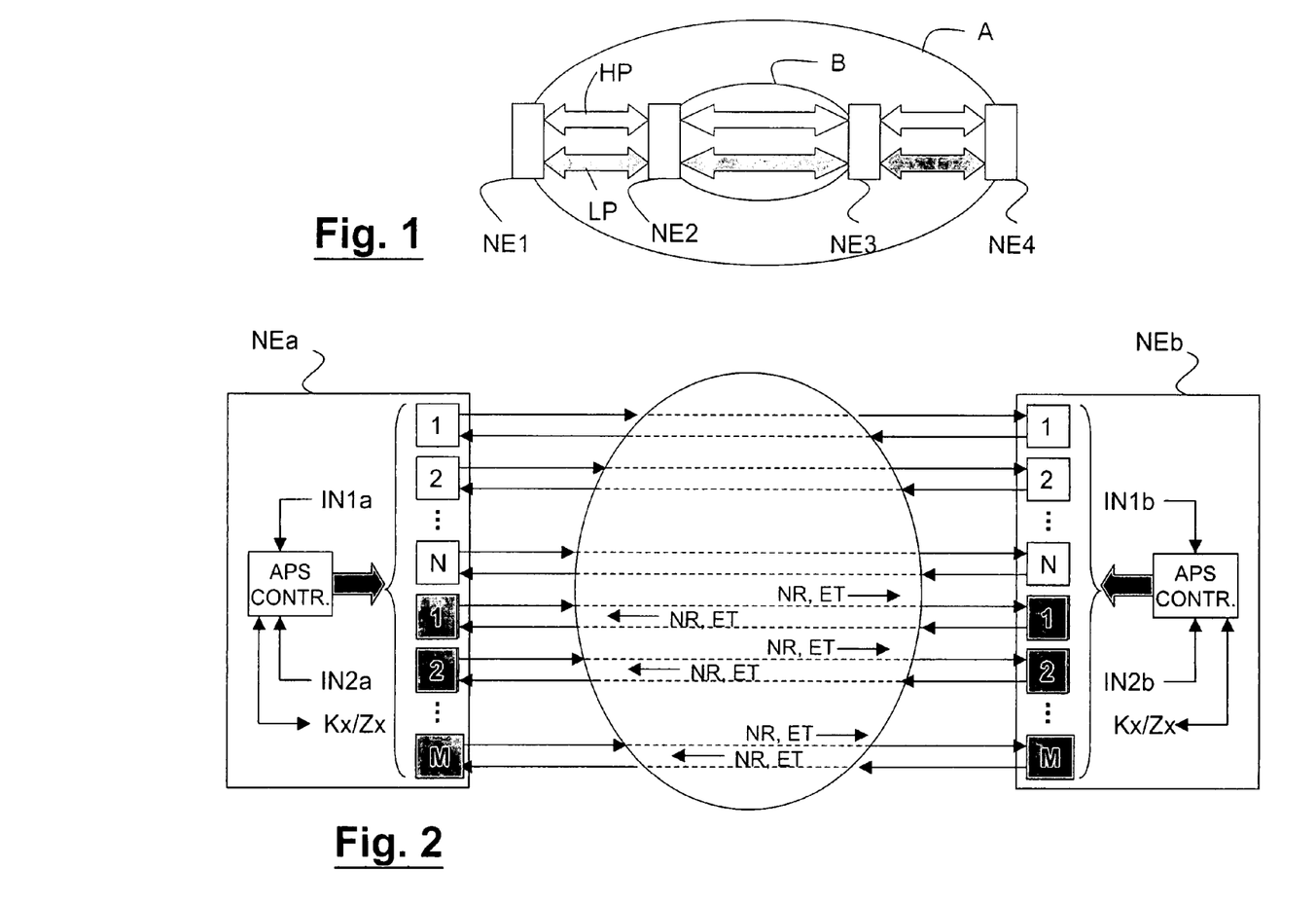
FIG. 1 diagrammatically shows an N:M protection scheme application according to the present invention.
FIG. 2 shows two network elements and a generic domain therebetween.

FIG. 1 shows a network domain B which is nested in a network domain A. Only a few network elements (NE1, NE2, NE3, NE4) have been shown for clarity reasons. The double-end arrows indicate bundles of paths: in particular, the white double-end arrows indicate N High Priority (HP) paths whilst the gray double-end arrows indicate M Low Priority (LP) paths. The N:M protection scheme according to the present invention applies both at intermediate level (namely from NE2 to NE3) and at end-to-end level (from NE1 to NE4). Consequently, it can perform path/trail protection both in a single operator environment and in a multi operator network.

The protection scheme according to the present invention protects paths (or trails) against failures both in the server layer and in the client layer. Switching criteria detection may be based on POM functionality: specifically, when applied to intermediate functionality, the use of Tandem Connection Termination functionality is not mandatory: a specific access for the HO/LO POH bytes carrying the protocol message exchange can be considered.

Bidirectional protection switching is supported and a protocol similar to the one currently implemented for Linear MSP (APS) N:1 is used. According to the present invention, a proper method allows to extend the handling of working and protection resources with respect to the limited number considered in current standard recommendations.

According to the present invention, extra traffic is supported on protection resources when these are not involved in protection actions.

FIG. 2 shows two network elements NEa, NEb and a generic domain therebetween. The generic domain could be as the domain B or A of FIG. 1. N working bidirectional lines connect NEa and NEb. Analogously, M protecting bidirectional lines connect NEa and NEb. In the idle state, as the one shown in FIG. 2, the protecting lines do not carry any HP traffic (possibly they carry LP traffic) and bridge requests ("NR", no request, "ET", extra traffic) are exchanged in both directions. Possibly, a Tandem Connection Termination could be activated between nodes NEa and NEb.

The APS controllers (APS CONTR.) of both NEa and NEb receive, from the working lines, N signal fail and/or signal degrade indications as first inputs (IN1a, IN1b). They also receive M signal fail and/or signal degrade indications (IN2a, IN2b) from the protecting lines.

According to the present invention, a protocol is assigned to any protection resources: if no failure is present in the domain, the protecting resources will carry extra traffic or will not carry any traffic. Thus, the APS controller within SDH or SONET NE's of the present N:M protection scheme is able to handle up to 14 protocol message exchanges, one for each protecting resource that is possibly handled ($M \leqq 14$). The evolution of each protocol instance, once the priority rules described in the following are applied, is dedicated to the specific switch initiation criterion affecting the specific normal traffic to be protected.

Thus, while certain rules are complied with, it is allowed to handle at the same time, both protecting resources in idle state and protection resources in switching state. For the purposes of the present invention, a protection resource is in idle state (see FIG. 2), when it is not currently involved in protection switch operations due to a failure (and/or degrade and/or command) condition; consequently, the bridge request processed for this resource and transmitted through the available Kx bytes (namely the bytes K3 and K4 at any SDH VC level) or Zx bytes (namely the bytes Z4 and Z7 at any SONET VC level) of POH carries the following codes: Type of Request=No Request (NR) and Traffic Number=either Extra Traffic (ET) or Null Signal (NS). Extra Traffic represents a low priority traffic pre-emptable by Normal Traffic (high priority traffic) when a protection switch requires the use of associated connection resource; Null Signal represents a not-meaningful traffic for the operator, to be used in order to configure the connection associated to the protection resource along the network. As such, it may be any kind of signal consistent with the structure of the specific layer, but ignored (i.e. not selected) at the 'tail' end of the scheme.

For the purposes of the present invention, a protection resource is in switching state, when it is currently involved in protection switch operations initiated by any kind of switch initiation criteria declared, except Control Commands. According to the type of switch criterion initiating the switching state:
  Extra Traffic signal (or Null Signal) can be pre-empted and Normal Traffic signal is recovered by using protection resources;
  Extra Traffic signal can be pre-empted and Null Traffic signal can be carried onto 'protection' resource; or
  Extra Traffic signal is not pre-empted by Normal Traffic signal kept onto 'working' section.

Extra Traffic pre-emption, when applicable, implies a squelching process at extra traffic termination ends through AIS insertion, towards drop side, at the specific layer considered. The Bridge Request processed and transmitted along the protection resource, when such a protection line is in switching state, carries the following parameter codes:
  Type of Request=Signal Failure/Signal Degrade/Switch Command;
  Traffic Number=Normal Traffic (NT)/Extra Traffic (ET)/Null Signal (NS).

Finally, a protection resource is considered by APS controller as available, when it is in the idle state.

The Applicant has elaborated a set of basic rules to be applied to the N:M protection scheme according to the present invention. An exemplifying and not limiting description of such basic rules are schematically set forth below. Rule #1: APS controller checks whether, among the pool of M protection resources, at least one of them is available, namely in the idle state (starting from a proper numbering of protection resources, the availability check could be performed by scanning, either in increasing or in decreasing order the protection resources pool). In the affirmative (Rule # 1.1), switch criterion is taken into account by APS controller as a valid input, a consistent Bridge Request is issued and the actions required by the new switch criterion are performed by using the available protection resource (regardless the priority level of Bridge Requests already served).

In the negative (Rule # 1.2), the priority level of Bridge Requests currently served is checked and compared with the priority of the new switch criterion. Then, Rule # 1.2.1: if the priority of new switch criterion is higher than at least one of the Bridge Requests currently served, then, the lowest priority request is pre-empted by the request associated to the new switch criterion and the actions required are performed by using the protection resource previously used by pre-empted Bridge Request;

Rule # 1.2.2: if the priority of new switch criterion is lower than or equal to Bridge Requests currently served, then, the new switch criterion is not considered as a valid input for APS controller and not signalled through protocol bytes; if new switch criterion is a command, it is dropped (i.e. it is not kept in pending status).

Rule #2: when more switch initiation criteria are simultaneously detected, the highest priority level request will be served as first; if the switch initiation criteria are at the same priority level it is proposed that the one referring to the lowest Traffic Number will be served first.

Rule #3: when more Signal Failure/Signal Degrade conditions are present within a protection group and not served, due to the lack of available protection resources, the highest priority condition is served first, as soon as one protection resource becomes available; again, in case of equal priority level, it is proposed that the condition referring to the lowest Traffic Number is served.

Rule #4: When more protecting resources are in WTR (Wait Time to Restore) condition and no other protection resource is available, a new Bridge Request, will override WTR state on protection resource $\underline{m}$, having lowest (or highest) number.

Preferably, the N:M trail protection scheme according to the present invention bases both Bridge Requests and acknowledgments on the protocol content specified for linear MSP (APS) application N:1. For SDH, the content of K1 and K2 bytes of MSOH (Line Overhead) is re-allocated according to the available bytes and bits of HO/LO POH and according to the End-to-End or Intermediate functionality to be supported. The protocol message exchange occurs on the HO/LO POH of the paths assigned to protection resources.

As it is known, in SDH linear MSP application, K1 byte carries the following parameters: a) type of request (bits 1-4); b) number of traffic signal for which the request is issued (bits 5-8). Similarly, K2 byte carries the following parameters: c) number of traffic signal bridged (bits 1-4); d) whether the MSP architecture is "1+1" or "1:N" (bit 5); e) MS-AIS/MS-RDI (bits 6-8). Since architecture type is by definition ":", then, information meaningful for SDH protocol message exchange are parameters a), b), and c).

In SONET linear APS application, K1 byte carries the following parameters: a) type of request (bits 1-4); number of the channel for which the request is issued (bits 5-8). Similarly, K2 byte carries the following parameters: c) number of channel bridged (bits 1-4); d) whether the MSP architecture is "1+1" or "1:N" (bit 5); e) operation mode (unidirectional, bi-directional) or AIS-L/RDI-L (bits 6-8).

Since architecture type is defined (":") and operation mode is bidirectional only, then information meaningful for SONET protocol message exchange are, again, parameters a), b), and c).

In SDH applications, the information considered at the previous point have to be mapped in K3 byte of VC4/VC3 POH for HO path protection; while for LO path protection, the same information have to be mapped into K4 byte of VC12 POH, as showed in FIGS. 3*a*-3*d*.

In particular, in case of

Figure 3A:
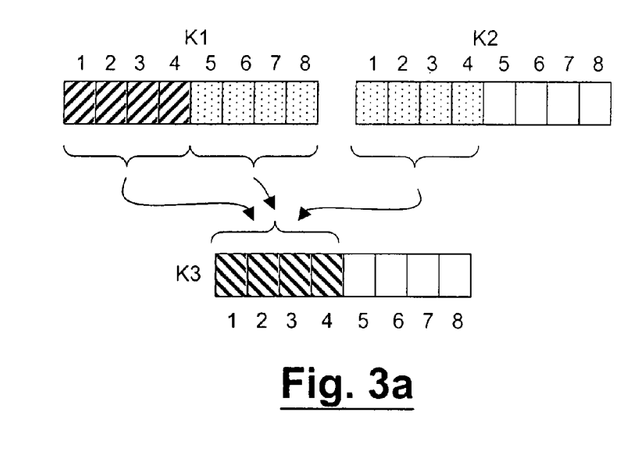
FIGS. 3a-3d show the mapping of meaningful coding in K3 and K4 signalings.
Figure 3B:
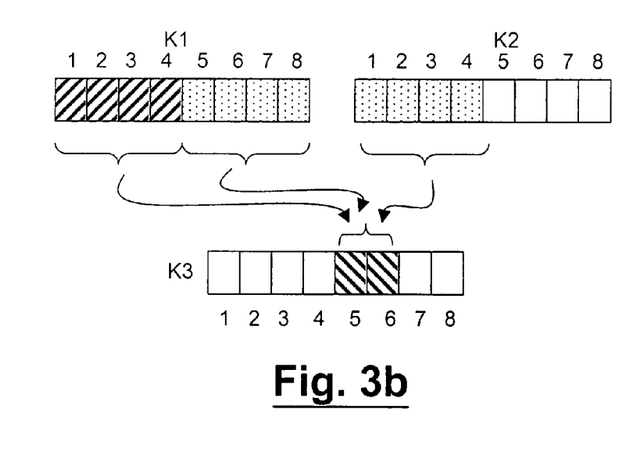
Figure 3C:
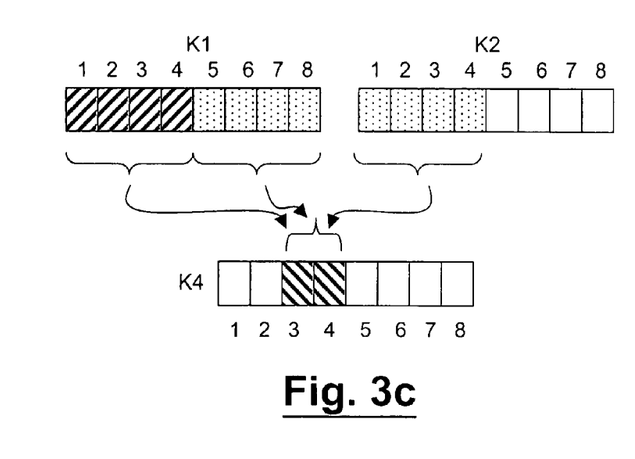
Figure 3D:
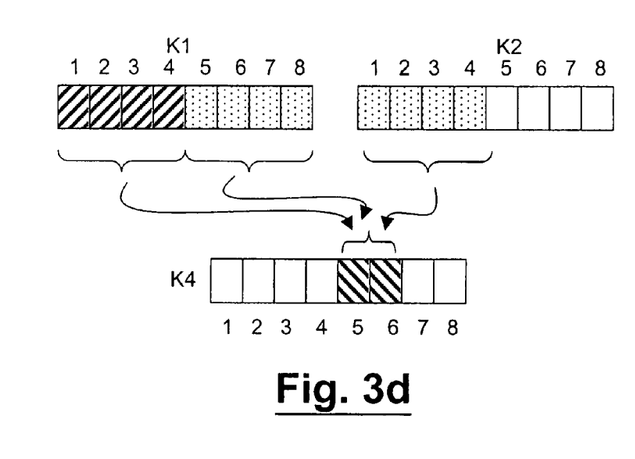

VC4/VC3 End-to-End N:M protection: bits 1-4 of K3 byte are used (FIG. 3*a*);

VC4/VC3 Intermediate N:M protection: bits 5-6 of K3, currently considered for future use, are used (FIG. 3*b*);

VC12 End-to-End N:M protection: bits 3-4 of K4 byte are used (FIG. 3*c*); and VC12 Intermediate N:M protection: bits 5-6 of K4 byte, accessible when not used for Enhanced RDI function currently considered as optional by ITU-T G.707 (FIG. 3*d*).

Similarly, in SONET applications, HO path protection needs that these information are mapped in Z4 byte of STS1 POH; while for LO path protection, the same information have to be mapped into Z7 byte of VT POH, as showed in FIGS. 4*a*-4*d*.

Figure 4A:
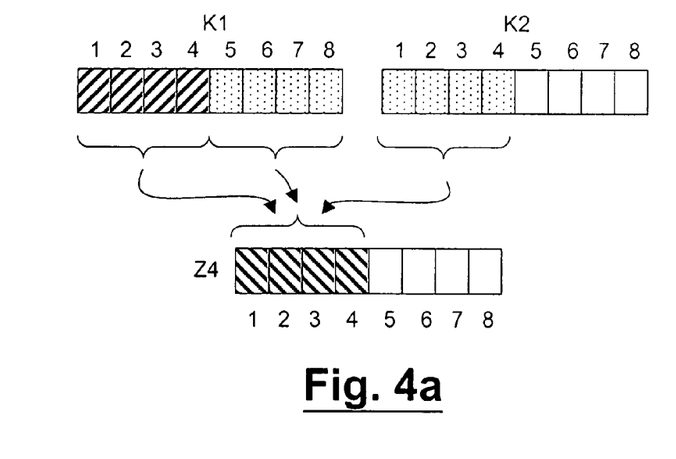
FIGS. 4a-4d show the mapping of meaningful coding in Z4 and Z7 signalings.
Figure 4B:
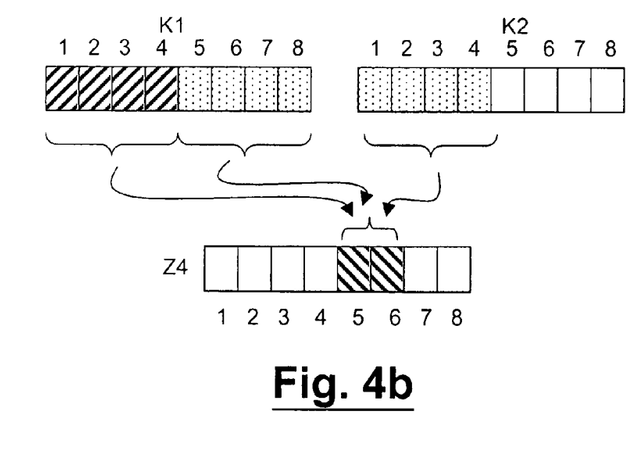
Figure 4C:
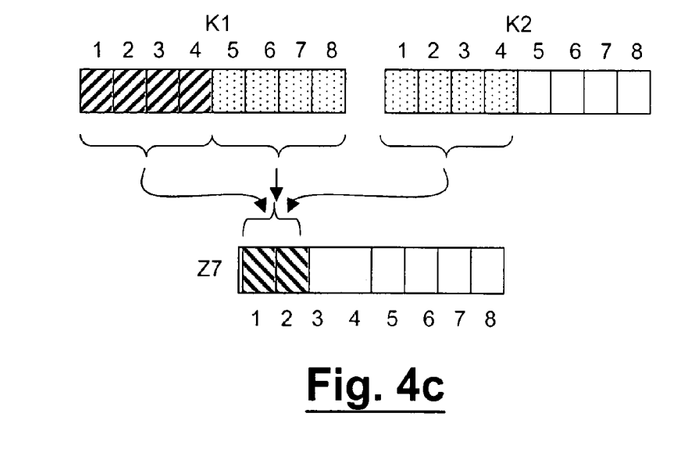
Figure 4D:
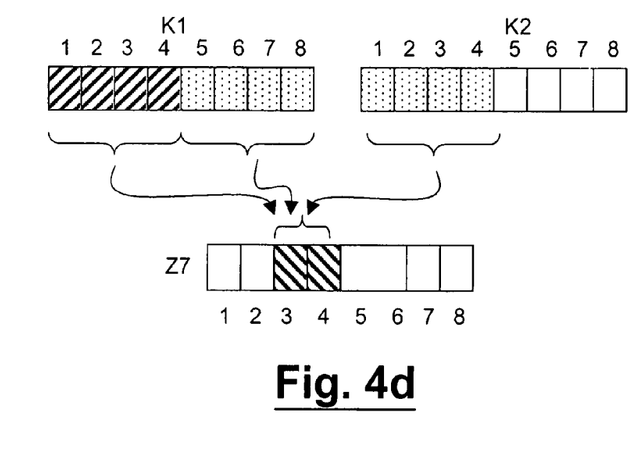

In particular, in case of:

STS1 End-to-End N:M protection: bits 1-4 of Z4 byte, which are currently considered for future growth, are used (FIG. 4*a*);

STS1 Intermediate N:M protection: bits 5-6 of Z4 byte, currently considered for future growth, are used (FIG. 4*b*);

VT End-to-End N:M protection: bits 1-2 of Z7 byte, currently considered for future growth, are used (FIG. 4*c*); and VT Intermediate N:M protection: bits 3-4 of Z7 byte, currently considered for future growth, are used (FIG. 4*d*).

Figure 5A:
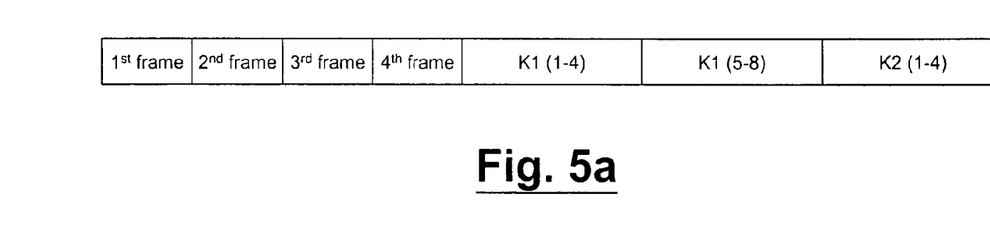
FIGS. 5a and 5b show two different types of multiframes.
Figure 5B:
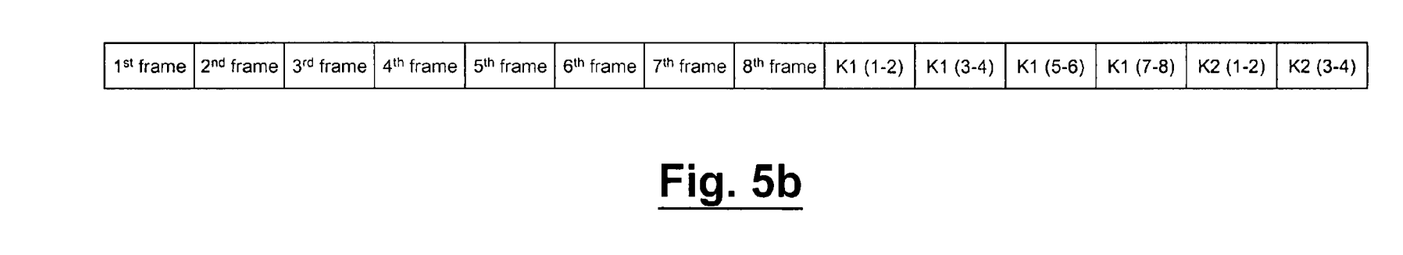

The bits available within the interested POH byte (K3, K4, Z4, Z7) could be two or four. According to the number of bits available within the interested POH byte, two different multiframes carrying the signaling for protocol message exchange can be defined. The Applicant has designed two different multiframe structures (types "A" and "B") that are shown in FIGS. 5*a* and 5*b*. The multiframe structures of FIGS. 5*a* and 5*b* are exemplifying and not limiting because other different structures could be devised. In particular, the alignment words could be replaced by CRC. In FIG. 5*a* a multi-frame type "A" is shown. It is 4-bits based and should be used for the functionality at HO level, with End-to-End protection purpose. In FIG. 5*b* a multi-frame type "B" is shown. It is 2-bits based and should be used for the functionality at HO level, with Intermediate protection purpose and for the functionality at LO level, with both End-to-End and Intermediate protection purpose. In both multi-frames "A" and "B", the multiframe alignment word is 2 byte long, as in the Tandem Connection.

In both multi-frames "A" and "B", a frame alignment word allows the correct alignment and processing of multi-framed signal: the same frame alignment word currently defined by ITU-T G.783 for "Tandem Connection" processing is proposed.

In an N:M protection scheme, the generation of HO/LO POH protocol bytes consequent to the application of the N:M protection algorithm is based on the following considerations:

on SDH applications, the rules to be applied for the handling of parameters carried by K3/K4 protocol bytes (i.e. "type of request", traffic number) are the same ones used for K1/K2 bytes generation in linear MSP bi-directional 1:N, with or without Extra Traffic, and specified in ITU-T G. 841 on SONET applications, the rules to be applied for the handling of parameters carried by Z4/Z7 protocol bytes (i.e. "type of request", traffic number) are the same ones used for K1/K2 bytes generation in linear APS bi-directional 1:N, with or without Extra Traffic, and specified in Bellcore GR-253.

In an N:M protection scheme according to the invention, only the revertive mode is supported. In the revertive mode of operation, the Normal Traffic signal shall be restored, i.e. the Normal Traffic signal on the protection trail/path shall be switched back to the working trail/path when this 'working' trail/path has recovered from the fault.

In order to prevent frequent switches due to a bouncing fault condition, as soon as the working trail/path becomes free from SF or SD condition (and no external command is present), a specific timer is started and the Bridge & Switch condition is kept until time (Wait To Restore) elapses. Then, the IDLE state is entered, Normal Traffic is restored and No Request code signaled through the protection resource.

In an N:M protection scheme the WTR condition is entered and signaled through a protection resource when the SF or SD condition disappears from the working resource protected.

A protection resource in WTR condition, is accessible due to SF or SD condition, only when no other protection resource is available, (see the above Rule # 1.2).

In an N:M protection scheme according to the invention, the control of the Bridge consequent to the application of the N:M protection algorithm and triggered by protocol message exchange, is based on the following considerations:

on SDH applications, the same rules used for the Control of the Bridge in linear MSP bi-directional 1:N (with or without Extra Traffic) and specified in ITU-T G. 841, are applied;

on SONET applications, the same rules used for the Control of the Bridge in linear APS bi-directional 1:N (with or without Extra Traffic) and specified in Bellcore GR-253, are applied.

In an N:M protection scheme according to the invention, the control of the Selector consequent to the application of the N:M protection algorithm and triggered by protocol message exchange, is based on the following considerations:

on SDH applications, the same rules used for the Control of the Selector in linear MSP bi-directional 1:N (with or without Extra Traffic) and specified in ITU-T G. 841, are applied;

on SONET applications, the same rules used for the Control of the Selector in linear APS bi-directional 1:N (with or without Extra Traffic) and specified in Bellcore GR-253, are applied.

In N:M protection scheme, regardless of the technology, HO/LO POH protocol bytes shall be accepted by APS controller as valid message only when identical bytes are received in three consecutive frames. Then, the protocol message evaluation is performed:

on SDH applications, by applying the same rules specified in ITU-T G. 841, as regards linear MSP bi-directional 1:N (with or without Extra Traffic);

on SONET applications, by applying the same rules specified in Bellcore GR-1230, as regards linear APS bi-directional 1:N (with or without Extra Traffic);

The requests to perform protection switching can be initiated both automatically and externally. Protection switching initiated by automatic commands is always based on protocol message exchange; while protection switching started by external commands can be based both on protocol message (switch commands) to accommodate remote end action and on local commands (control commands).

N:M trail protection scheme are automatically initiated when Signal Fail or Signal Degrade conditions are declared. Specifically:

Automatic Commands in SDH NE: HO/LO Trail Signal Fail condition and HO/LO Trail Signal Degrade condition are according to the definition given in ITU-T G.783;

Automatic Commands in SONET NE: Signal Fail and Signal Degrade are according to the definitions given in Telcordia Technologies GR 1400 on 'STS path selection' and on 'VT path selection'.

The commands listed in the following can be initiated at a NE by OS or craft terminal application and apply to all the technologies considered in the present description.

Switch commands in descending order of priority:

Clear: this command clears all the externally initiated switch commands listed below and WTR at the node to which the command was addressed.

Lockout of Protection (p): denies all Normal Traffic signals (and the Extra Traffic signal, if configured) access to the protection trail (p) by issuing a Lockout of Protection request on the addresses protection trail/path.

Lockout of all Protection channels: it denies all Normal Traffic signals (and the Extra Traffic signal, if configured) access to all the protection trail/path, by issuing a Lockout of Protection request on all of the protection trails/paths.

Forced Switch (w) to Protection (p): switches Normal Traffic signal from working trail/path (w) to the protection trail/path (p), by issuing a forced switch request for that traffic signal on the addressed protection trail/path.

Forced Switch (p) to Working: switches the Normal Traffic signal from protection trail (path) to the 'working' trail (path), by issuing a forced switch request for the traffic signal carried on the addressed protection trail (path), restoring the connection of that Normal Traffic to the starting working trail (path). In N:M scheme without Extra Traffic, this command restores Null signal on the addressed 'protection' trail (path). In N:M scheme with Extra Traffic, this command restores Extra Traffic on the addressed protection trail/path.

Manual Switch (w) to Protection (p): it switches Normal Traffic signal from working trail/path (w) to the protection trail/path (p), by issuing a manual switch request for that traffic signal on the addressed protection trail/path.

Manual Switch (p) to Working: it switches the Normal Traffic signal from protection trail/path to the working trail/path by issuing a manual switch request for the traffic signal carried on the addressed protection trail/path, restoring the connection of that Normal Traffic to the starting working trail/path. In N:M scheme without Extra Traffic, this command restores Null signal on the addressed 'protection trail (path). In N:M scheme with Extra Traffic, this command restores Extra Traffic on the addressed 'protection' trail (path).

Exercise (p): it exercises the protocol on the addressed protection trail/path, activating the whole protocol message exchange used for protection switching between ends, checking responses on APS bytes, but without performing the real switch: i.e. the selector of both ends is kept released. The Normal Traffic number contained in the exercise request is fixed (whichever value in the range 1÷14).

The control commands setting and modifying APS protocol operation are the following:

Clear Lockout of Working (w): it clears the Lockout of Working command for the Normal Traffic signal carried into the addressed working trail/path/path.

Lockout of Working (w) [LW (w)]: it prevents the Normal Traffic signal carried into the working trail/path (w) from switching to any protection trail/path both for local and remote requests. The application of a "LW (w)" implies that APS controller does not take into account switching criteria associated to the addressed "working" channel. Thus, if the locked Normal Traffic is not involved in protection switching, "LW (w)" command application is not reflected in any APS signaling: current APS protocol exchange is kept on each "protection" trail; if, on contrary, the locked Normal Traffic is already involved in protection switching, "LW (w)" command application forces APS controller to ignore the switch criterion currently served, releasing "bridge&switch" and signaling "No Request" on the "protection" trail/path previously used. Lockout of Working command can be activated or cleared for each Normal Traffic signal independently, and any number of Normal Traffic signals can be locked out at the same time. The "LW (w)" command (so as the "Clear") is not signaled through specific code via APS bytes, and even if the bi-directional behaviour is implicitly achieved ("Bridge Request" is nor issued neither acknowledged), for a "clean" management of the network the application of the command to both ends involved is recommended.

Figure 6A:
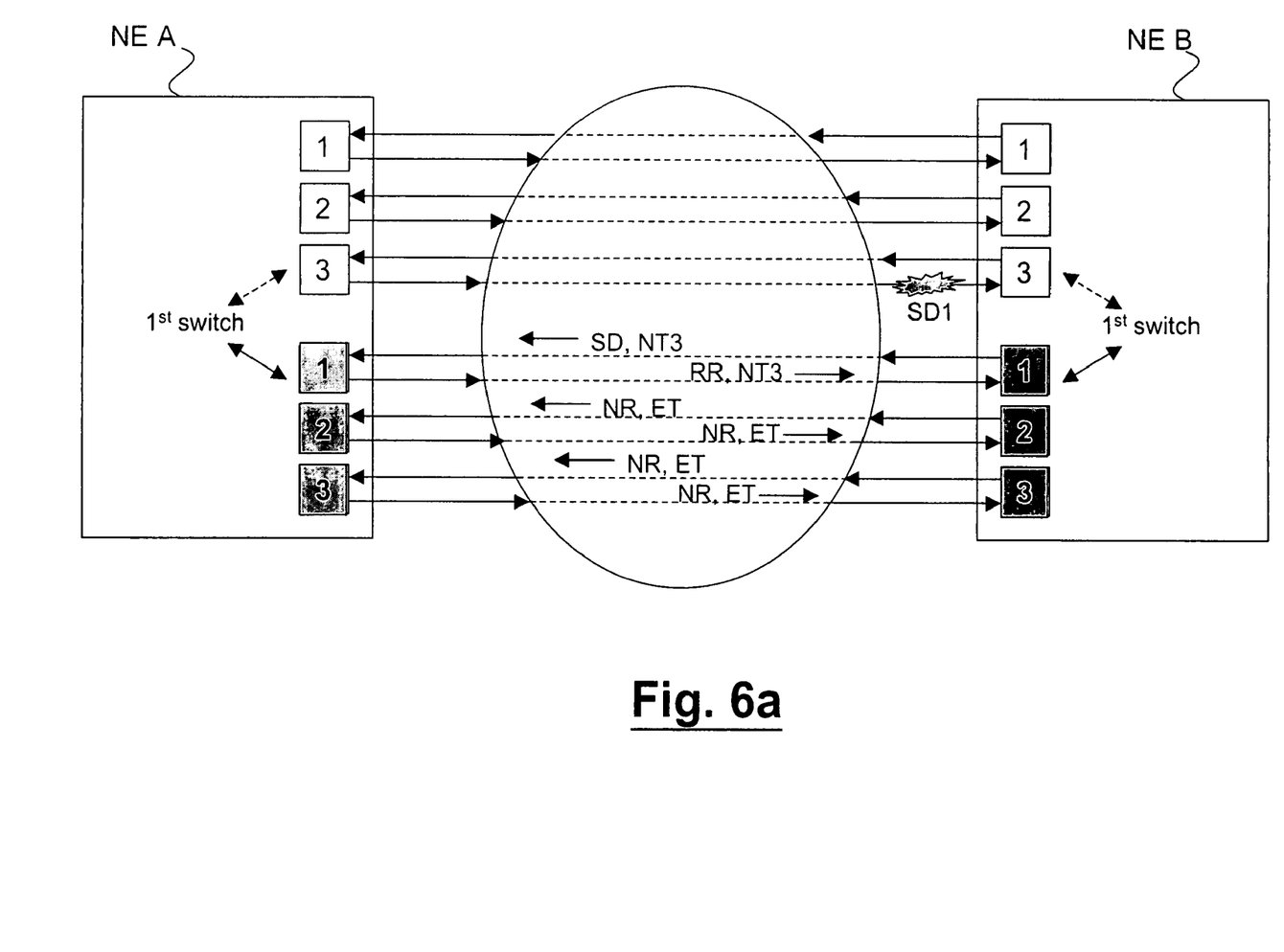
FIGS. 6a-6b and 7a-7b show different failure scenarios managed by a N:M mechanism according to the present invention.
Figure 6B:
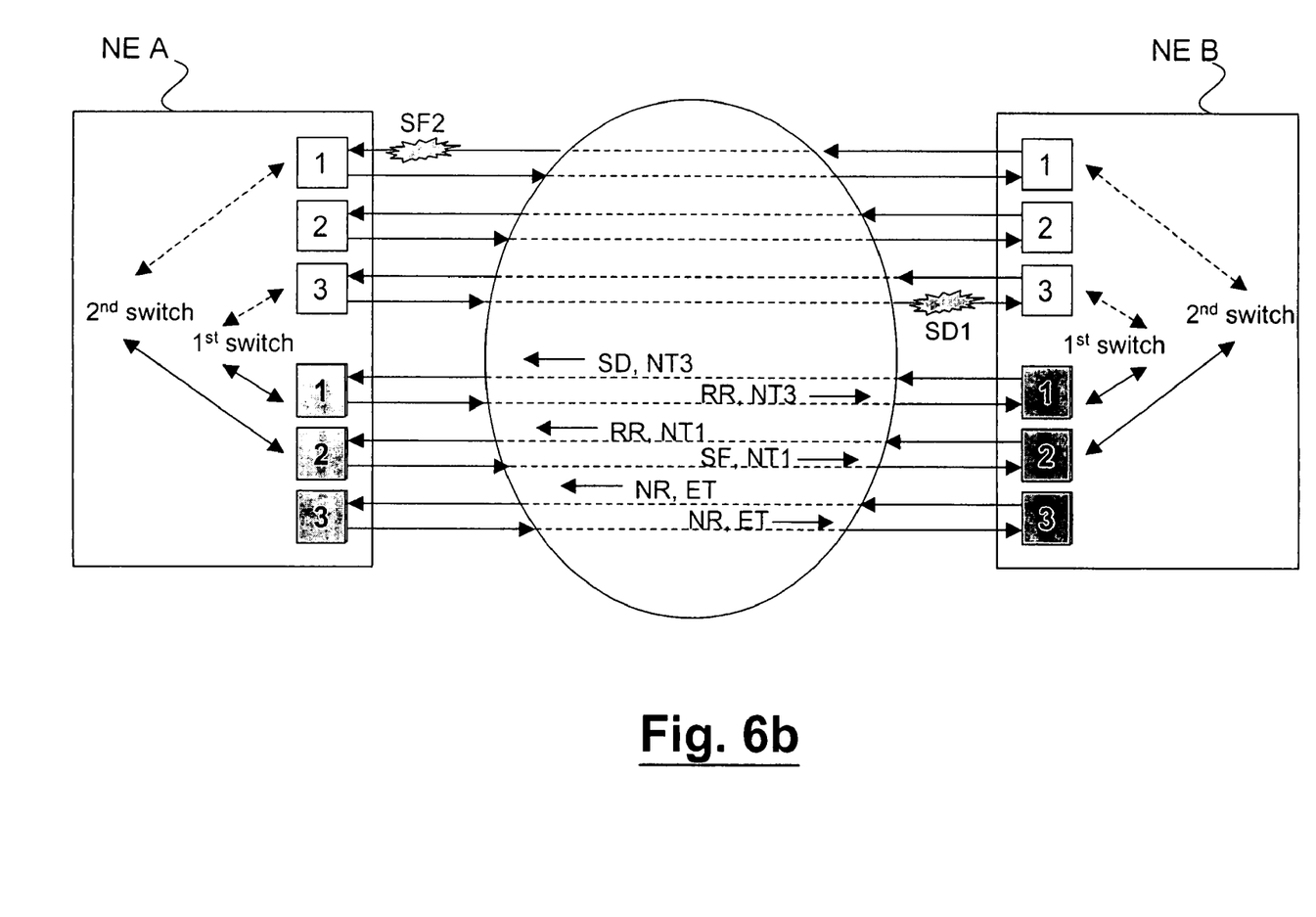

With reference to FIGS. 6a and 6b, a first example of protection switch operation between two generic NE's A and B will be described. The handling supposed may be either "Intermediate" or "End-to-End". In the first example, it is supposed that at least a protection resource is available. (A Tandem Connection Termination could be possibly activated between the two generic NE's A and B, with no impact to the protection scheme functionality).

The scenario showed in FIGS. 6a-6b, is an example of a 3:3 protection scheme, having protection resources available to serve, without any pre-emption, up to three switch criterions possibly occurring.

The example considers a first Signal Degrade SD1 condition affecting working path No. 3. According to the above Rule #1.1, the first available resource found is protection channel No. 1: Extra Traffic No. 1 is, consequently, squelched, a Bridge Request signalling SD condition on working channel No. 3 is issued and Normal Traffic No. 3 is, then, recovered.

The protocol message exchange used through protection channel No. 3 for establishing the Bridge & Switch action due to Signal Degrade condition is:

on SDH applications, according the protocol exchange described in ITU-T G. 841; or on SONET applications, according the protocol exchange described in Bellcore GR 253.

A Signal Fail (SF2) condition is now supposed to occur on working path No. 1 (see FIG. 6b).

Rule # 1.1 is, again, applicable, and first available resource found is protection channel No 2: Extra Traffic No. 2 is, consequently, squelched, a Bridge Request signalling SF2 condition on working channel No. 1 is issued and Normal Traffic No. 1 is, then, recovered.

The protocol message exchange used through protection channel No. 3 for establishing the Bridge & Switch action due to SF condition is:

on SDH applications, according the protocol exchange described in ITU-T G. 841;

on SONET applications, according the protocol exchange described in Bellcore GR 253.

It has to be taken into account that the protocol exchange described both in ITU-T G. 841 and Bellcore GR 253 refers to the pre-emption of SD condition by next SF occurred: one protection channel is, in fact, considered. In N:M protection scheme, when protection resources are available, the protocol evolution starts from idle state rather than from switching state. Thus, for the example considered, same protocol exchange described in ITU-T G. 841 and Bellcore GR 253 on first switch criterion occurred (i.e. SD1), applies also to the second switch criterion (SF2).

Figure 7A:
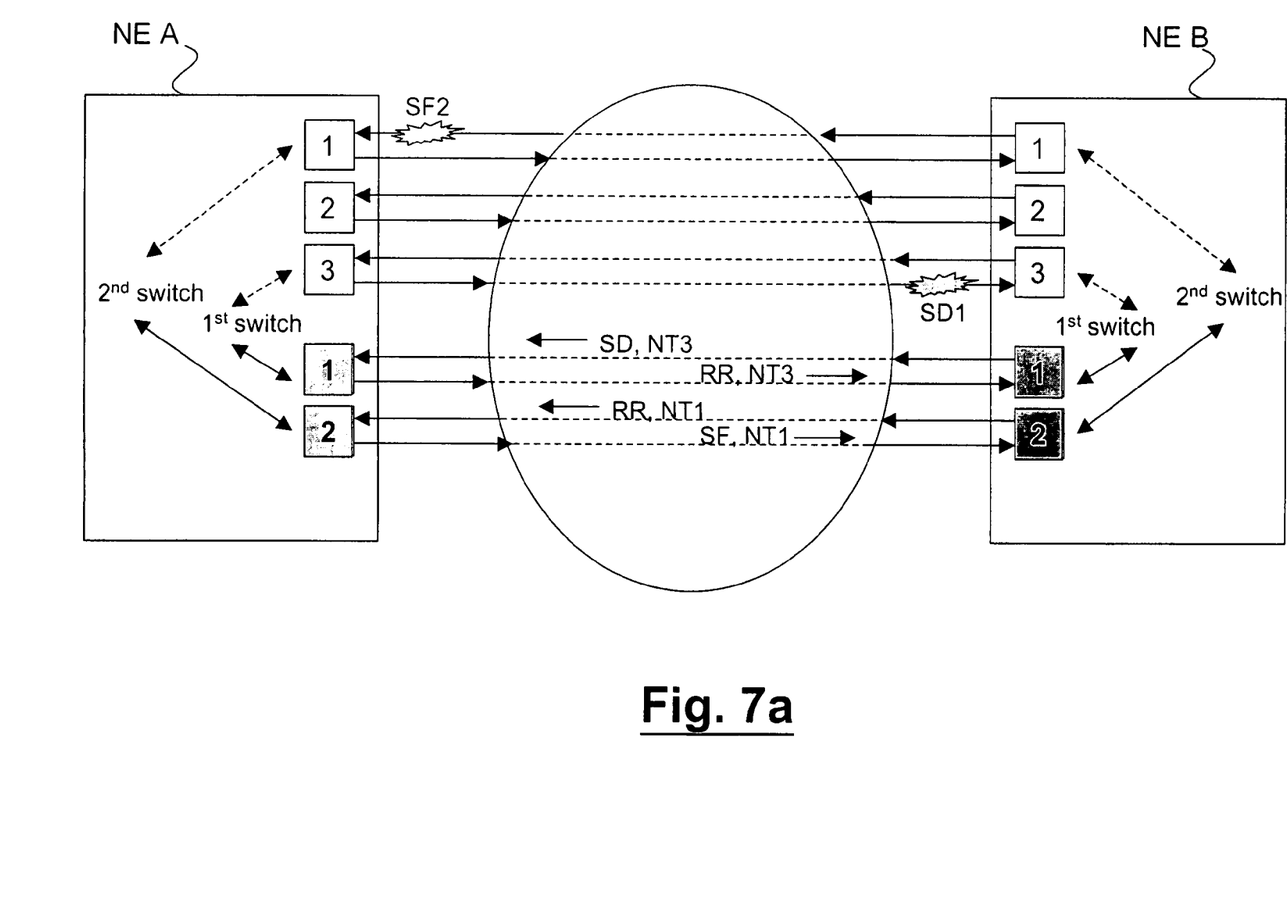

The scenario showed in FIG. 7a, is an example of 3:2 protection scheme according to the present invention, where both protection resources are involved in protection activity, recovering Normal Traffic No. 3 and Normal Traffic No. 1, respectively from a signal degrade SD1 condition and a Signal Fail SF2 condition. Extra Traffic paths No. 1 and No. 2 are, then, squelched.

In this condition, a further switch criterion occurring is evaluated according to Rule #1.2 (see FIG. 7b): the priority level of new switch criterion on working path 2 is compared with the level of Bridge Requests currently served and, since the highest priority of SF with respect to SD, the Bridge & Switch actions performed for the previous recovery of Normal Traffic No. 3 is pre-empted in order to realize (on protection channel No. 1) the recovery of Normal Traffic No. 2.

Figure 7B:
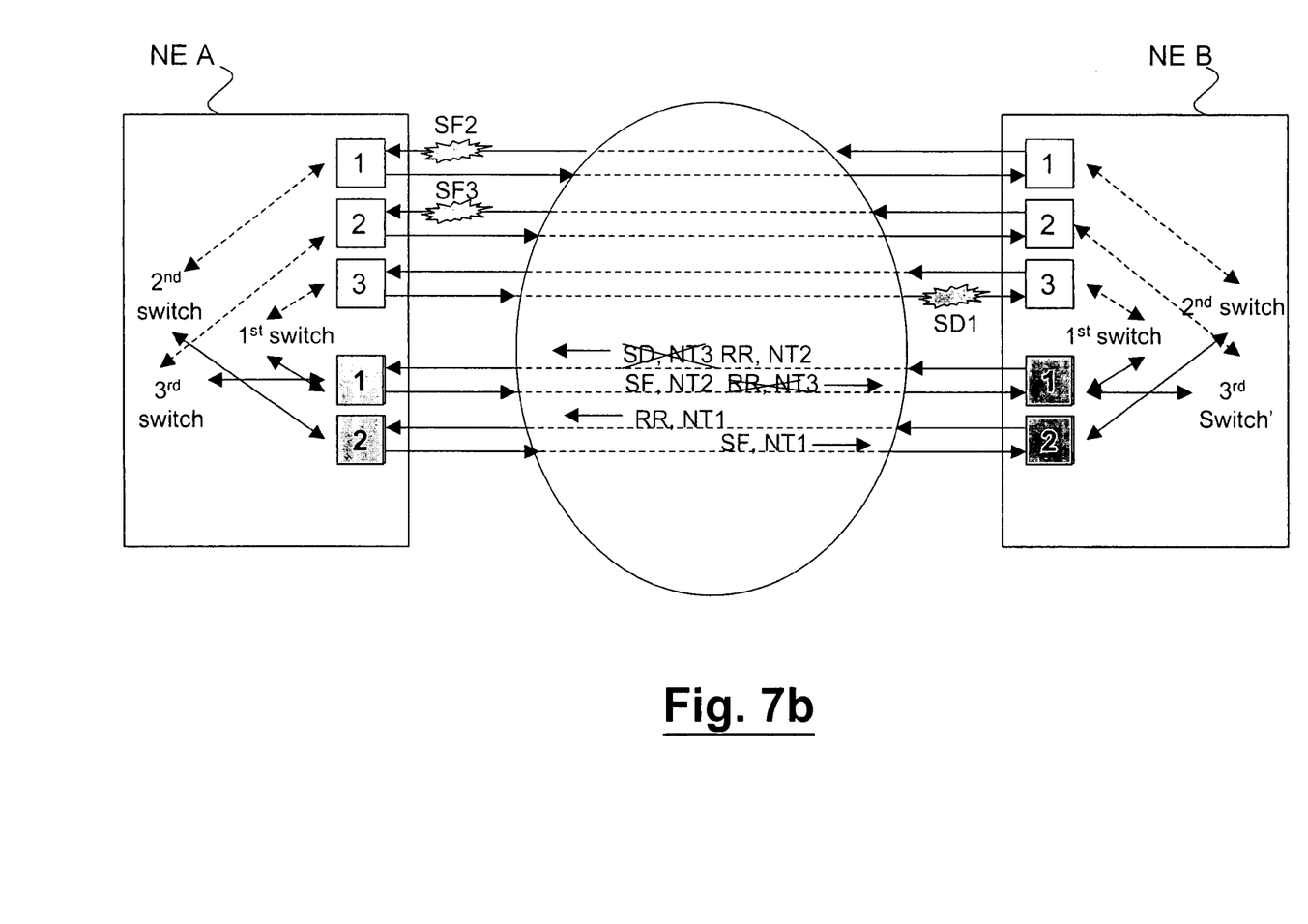

Consequently, Normal Traffic paths No. 1 and No. 2 are recovered; Normal Traffic No. 3 is no more protected from SD, then it is degraded; Extra Traffic paths No. 1 and No. 2 keep on to be squelched.

The protocol message exchange used through protection channel No. 1 for establishing the Bridge & Switch action due to SF condition, pre-empting previous Bridge & Switch due to SD condition, is:

on SDH applications, according the protocol exchange described in ITU-T G. 841;

on SONET applications, according the protocol exchange described in Bellcore GR 253.

The present invention enhances the features of standardized scheme ("N:M" vs "1:1") taking into account statements currently defined and covering the lack of definitions not yet standardized.

The mechanism according to the present invention does not require an OS application to the operator and becomes attractive in multi-operator environment, as well as in single operator environment.

Because of previous condition, in multi-operator environment, no OS applications compatibility is required for managing traffic reliability, so as no negotiation among operators is needed.

Because of the automatic process based on protocol exchange handled at NE level, the restoration time (protection switch time) is significantly lower than time required by restoration processes currently known and comparable with performance of NE protection schemes currently known (tens of msec).

Finally, the present invention can be supported also in Intermediate NE's and is able to handle up to 14 working resources and up to 14 protecting resources.

ABBREVIATIONS LIST

SDH=Synchronous Digital Hierarchy
SONET=Synchronous Optical NETwork
ADM=Add-Drop Multiplexer
DXC=Digital Cross-Connect
MSP=Multiplex Section Protection
POH=Path OverHead
STS=Synchronous Transport Signal
VT=Virtual Tributary
OS=Operation System
NE=Network Element
POM=Path Overhead Monitoring
HO=High Order
LO=Low Order
APS=Automatic Protection Switching
NR=No Request
ET=Extra Traffic
VC=Virtual Container
MSOH=Multiplex Section Overhead
AIS-L=Line Alarm Indication Signal
RDI-L=Line Remote Defect Indication
CRC=Cyclic Redundancy Code
SD=Signal Degrade
SF=Signal Fail
NS=Null Signal
AIS=Alarm Indication Signal
WTR=Wait Time to Restore
MS-AIS=Multiplex Section Alarm Indication Signal
MS-RDI=Multiplex Section Remote Defect Indication
HP=High Priority
LP=Low Priority
NT=Normal Traffic
ITU=International Telecommunication Union
RR=Reverse Request

We claim:

1. A method for enhancing a trail/path protection function in at least one of a synchronous digital hierarchy (SDH) network and a synchronous optical networking (SONET) network, the network comprising a number N of working resources and a number M of protection resources and transmitting signal frames having a section overhead (SOH) in SDH technology, or a Line OverHead (LOH) in SONET technology, and a path overhead (POH), said trail/path protection function comprising a linear multiplex section protection (MSP) N:1 trail protection function based on transmission of protection information through K1 and K2 bytes of the SOH in the SDH technology or the LOH in the SONET technology, wherein the method comprises:

mapping content of said K1 and K2 bytes by protocol exchange into POH bytes of the path overhead in the SDH or the SONET technology, for at least one of a Low Order path level and a High Order path level to allow handling of the M protection resources shared among the N working resources in an end-to-end handling and an intermediate handling, wherein mapping comprises:

providing a first multiframe, mapping the content of the K1 and K2 bytes into a first portion of the POH bytes for each frame of the first multiframe for the end-to-end handling, providing a second multiframe, and mapping the content of the K1 and K2 bytes into a second portion of the POH bytes for each frame of the second multiframe for the intermediate handling.

2. The method according to claim 1, wherein mapping the content of said K1 and K2 bytes into the POH bytes further comprises one of:
mapping into K3 byte at the high order path level and into K4 byte at the low order path level for the SDH technology; and
mapping into Z4 byte at the high order path level and into Z7 byte at the low order path level for the SONET technology.

3. The method according to claim 2, wherein mapping the content of said K1 and K2 bytes into the POH bytes further comprises:
providing a four-bit based multiframe for the first multiframe.

4. The method according to claim 2, wherein mapping the content of said K1 and K2 bytes into the POH bytes further comprises:
providing a two-bit based multiframe for at least one of the first and second multiframe.

5. The method according to claim 1, further comprising:
performing a check step for checking whether at least one of the protection resources is available in an idle state if one of the working resources fails; and
providing a check result.

6. The method according to claim 5, wherein performing the check step comprises:
assigning a number to each protection resource; and
scanning, the protection resources in one of an increasing order and a decreasing order of the assigned numbers.

7. The method according to claim 5, wherein a new switch criterion is taken into account by an automatic protection switching (APS) controller as a valid input, a consistent Bridge Request is issued and actions required by the new switch criterion are performed by using the available protection resource, regardless priority levels of Bridge Requests being served, if the provided check result is positive.

8. The method according to claim 7, wherein the priority levels of the Bridge Requests currently served is checked and compared with a priority of the new switch criterion, if the provided check result is negative.

9. The method according to claim 8, wherein if the priority of the new switch criterion is higher than at least one priority level of the Bridge Requests currently served, the lowest priority request is pre-empted by the request associated to the new switch criterion and the actions required are performed by using the protection resource previously used by the pre-empted Bridge Request.

10. The method according to claim 8, wherein:
if the priority of the new switch criterion is lower than or equal to the priority levels of the Bridge Requests currently served, the new switch criterion is not considered as the valid input for the APS controller and not signalled through protocol bytes; and
if the new switch criterion is a command, the new switch criterion is dropped by not being kept in a pending status.

11. The method according to claim 5, wherein, when more than one switch initiation criterion are simultaneously detected, one of:

serving the highest priority level request first if the detected switch initiation criterions have different priority levels; and
serving a priority level request, which corresponds to the lowest Traffic Number first, if the detected switch initiation criterions have the same priority levels.

12. The method according to claim 5, wherein, when Signal Failure/Signal Degrade conditions are present within a protection group and not served, due to a lack of available protection resources, the highest priority condition is served first as soon as one of the protection resources becomes available.

13. The method according to claim 5, wherein the protection resources are in a Wait Time to Restore (WTR) condition and no other protection resource is available, the method further comprises:
overriding the WTR state on the protection resource having one of a lowest assigned number and a highest; assigned number with a new Bridge Request.

14. A network element for at least one of a synchronous digital hierarchy (SDH) network and a synchronous optical networking (SONET) network comprising at least two network elements, wherein an enhanced trail/path protection function is implemented, the network comprising a number N of working resources and a number of protection resources and transmitting signal frames having a section overhead (SOH) in SDH technology, or a Line OverHead (LOH) in SONET technology, and a path overhead (POH), said enhanced trail/path protection function comprising a linear multiplex section protection (MSP) N:1 trail protection function based on transmission of protection information through K1 and K2 bytes of the SOH in the SDH technology or the LOH in the SONET technology, wherein the network element comprises a device which maps or de-maps content of said K1 and K2 bytes by a protocol exchange into POH bytes of the path overhead in the SDH technology or the SONET technology, for at least one of a Low Order path level and a High Order path level to allow handling of the M protection sources shared among the N working resources in an end-to-end handling and an intermediate handling, the network element is adapted to:
provide a first multiframe and a second multiframe,
map the content of the K1 and K2 bytes into a first portion of the POH bytes for each frame of the first multiframe for the end-to-end handling, and
map the content of the K1 and K2 bytes into a second portion of the POH bytes for each frame of the second multiframe for the intermediate handling.

15. The network element according to claim 14, wherein the first multiframe comprises a four-bit based multiframe whose payload comprises bits 1 through 4 of the byte K1, bits 5 through 8 of the byte K1 and bits 1 through 4 of the byte K2.

16. The network element according to claim 14, wherein at least one of the first and second multiframe comprises a two-bit based multiframe whose payload comprises bits 1 and 2 of the byte K1, bits 3 and 4 of the byte K1, bits 5 and 6 of the byte K1, bits 7 and 8 of the byte K1, the bits 1 and 2 of the byte K2, and bits 3 and 4 of the byte K2.

17. A computer readable medium having a program recorded thereon, said computer readable medium comprising computer program code means adapted to perform the method according to claim 1 when said program is run on a computer.

* * * * *

UNITED STATES PATENT AND TRADEMARK OFFICE
CERTIFICATE OF CORRECTION

PATENT NO. : 7,630,297 B2 Page 1 of 1
APPLICATION NO. : 10/822667
DATED : December 8, 2009
INVENTOR(S) : Sestito et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1601 days.

Signed and Sealed this

Twenty-first Day of December, 2010

David J. Kappos
*Director of the United States Patent and Trademark Office*